Dec. 14, 1948.  R. D. McDILL  2,456,296
VISUAL INSPECTION PROJECTION APPARATUS
Filed Jan. 31, 1946  2 Sheets-Sheet 1

INVENTOR
Rex D. McDill
BY
Hawgood and Van Horn
HIS ATTORNEYS

Dec. 14, 1948.　　　　　R. D. McDILL　　　　　2,456,296
VISUAL INSPECTION PROJECTION APPARATUS
Filed Jan. 31, 1946　　　　　　　　　　　　　　2 Sheets-Sheet 2

INVENTOR.
Rex D. McDill
BY
Hawgood and Van Horn
HIS ATTORNEYS

Patented Dec. 14, 1948

2,456,296

UNITED STATES PATENT OFFICE 2,456,296

VISUAL INSPECTION PROJECTION APPARATUS

Rex D. McDill, Cleveland Heights, Ohio

Application January 31, 1946, Serial No. 644,491

3 Claims. (Cl. 88—24)

This invention relates to visual inspection and apparatus by which it may be performed.

An object of the invention is to provide an improved and convenient means for visually inspecting and comparing physical characteristics of articles.

Another object is to provide an improved means for greatly magnifying specimens which it is desired to inspect.

Another object is to provide an improved means for greatly magnifying specimens which will not impose substantial eyestrain upon the observer.

Another object is to provide an improved means for greatly magnifying specimens which may be easily operated.

Another object is to provide an improved means for greatly magnifying specimens which will be composed of few and simple parts.

Another object is to provide an improved means and method for greatly magnifying a plurality of specimens in which images may be brought into juxtaposition for comparison with each other.

Another object is to provide an improved means and method for greatly magnifying a plurality of specimens in which images may be superposed and relatively moved at will and while magnified.

Another object is to provide an improved means for greatly magnifying specimens in which images at different planes through the same specimen may be examined.

Other objects will hereinafter appear.

The invention will be better understood from the description of one practical embodiment thereof, illustrated in the accompanying drawings, in which.

The present invention is intended for use with transparent slides which may be sections of materials or reversed surface replicas such, for instance, as are disclosed in my prior applications, Serial No. 505,998, filed October 12, 1943, now abandoned, and Serial No. 585,378, filed March 28, 1945, and which may be mounted in any suitable holders.

These applications disclose the making of slides of transparent plastic material having one smooth side and one side formed as the reversed replica or intaglio of the surface of an article regarding which information is desired.

These replicas, as disclosed in said applications, may readily be formed by coating the surface in which the observer is interested, such as a finished surface of a metallic part, with a solvent and plastic (or with a solution of plastic in said solvent) and then applying a smooth film of the plastic over this wetted surface, the solvent, due to the fact that it is of a character to wet the surface of the article to be inspected, penetrating the minute crevices thereof and drawing into the same plastic from the adjacent side of the film (or plastic already dissolved in the solvent) and forming on the adjacent side of the film a cast or reproduction in reverse of all the surface characteristics.

The film, with the intaglio formed on one side thereof, and preferably supported in a retaining mount or folder, is according to the present invention placed adjacent a source of light, the light passing through the film being projected and focused first upon a reflecting surface and then upon a screen conveniently arranged for observation.

Figure 1:
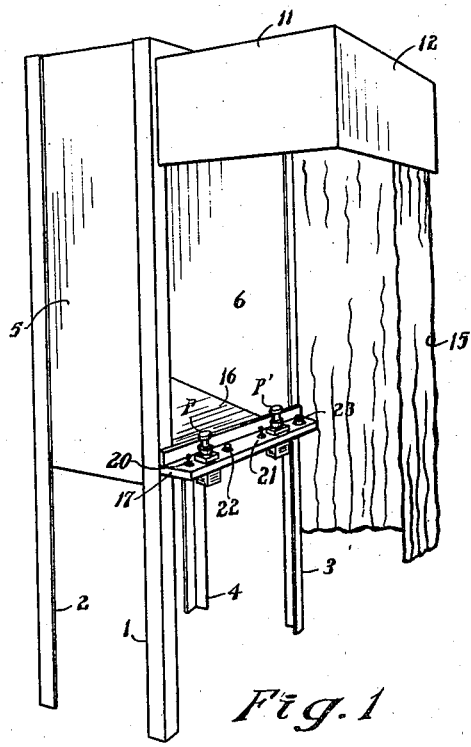
Figure 1 is a perspective view of a booth for a comparative study of two articles.
Figure 2:
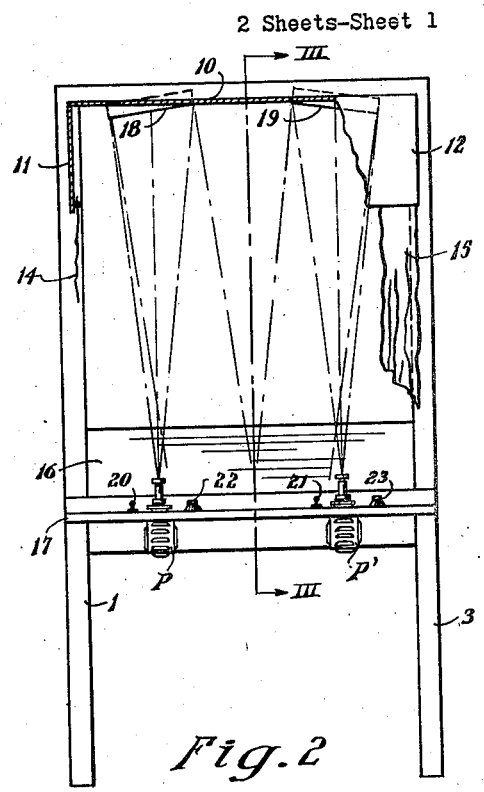
Figure 2 is a cross-sectional view of the booth of Figure 1.
Figure 3:
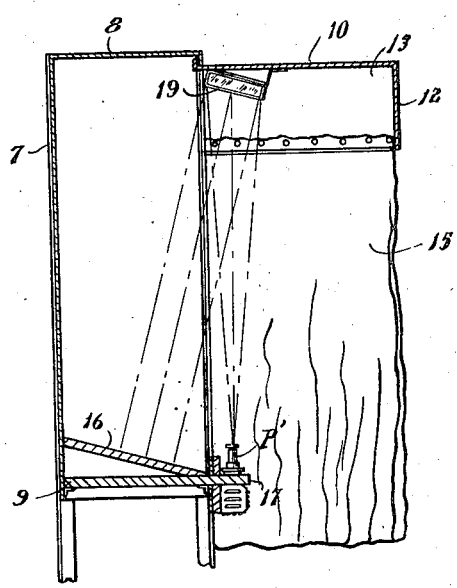
Figure 3 is a cross-sectional view of the same booth at right angles to Figure 2, and taken on the line III—III thereof.

In Figures 1 to 3 the projecting mechanism, screen and reflectors are shown as assembled into a structure constituting a kind of booth, supported on four legs 1, 2, 3 and 4 shown as vertical pieces of angle-shaped metal. These legs carry sides 5 and 6, a back 7, a top 8, and a bottom 9, thus forming a box-like space having one open side facing to the front.

Extending out over the open front of the space is a hood comprising a top 10 having depending marginal flanges 11, 12 and 13 within which are secured the upper edges of two light-obstructing curtains 14 and 15, so that when the curtains are closed, light is prevented from entering the front of the box-like portion in any substantial quantity, while an observer can stand within the curtains and operate the apparatus, there being adequate ventilation under the curtains and the bottom of the box-like portion of the structure.

The bottom of the box may be inclined or provided with a separate inclined screen 16, as best shown in Figure 3, upon which one or more images may be projected.

The legs extend to such distance below the box-like enclosure that this screen is at a convenient elevation with relation to the observer's eye for him easily to study any images projected thereon.

Figure 4:
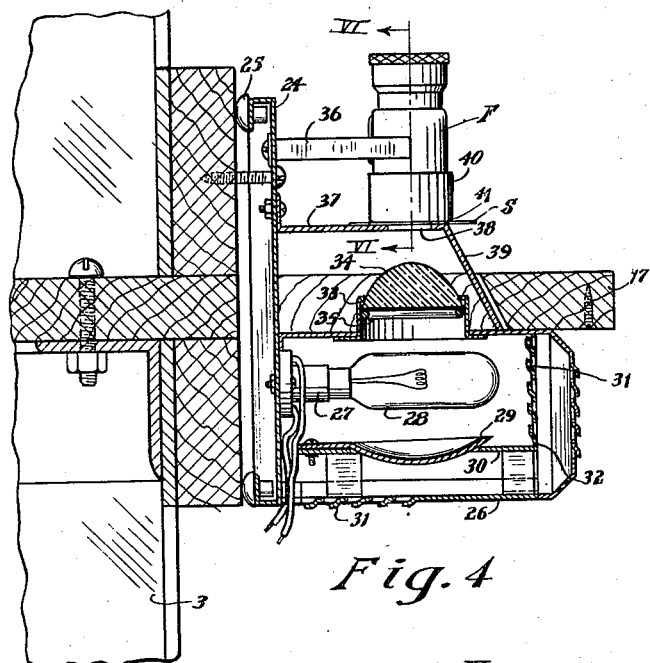
Figure 4 is an enlarged sectional view of the projecting apparatus of the preceding figures.
Figure 6:
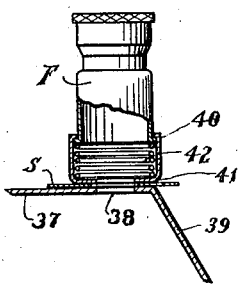
Figure 6 is a fragmentary sectional view of a part of the projection apparatus taken on the line VI—VI of Figure 4.
Figure 5:
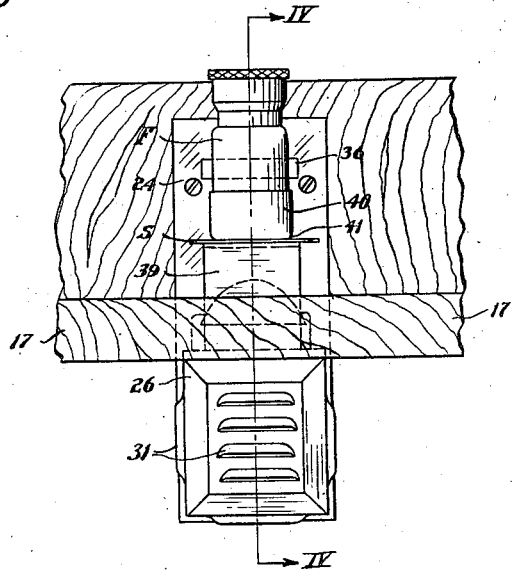
Figure 5 is an elevational view of the projector of Figure 4.

Extending across and attached on the front side of the legs 1 and 3 is a shelf 17 carrying two identical projecting units, indicated generally in the first three figures at P and P', both being substantially as illustrated in Figures 4, 5 and 6, and consisting of a source of light, a focusing lens and a means for holding the slide above mentioned. These projectors will be more fully described hereinafter.

These projectors project their light upwardly against two adjustable mirrors 18 and 19 carried within the top of the space defined by the box-like portion and the projecting hood and adjustable so that light thrown upon them by the projectors may be reflected on the screen 16.

Preferably, these mirrors are silvered on their outer surfaces to eliminate refraction of the light.

The angles to which the mirrors are adjusted, as well as that of the screen, are such that light reaching the screen is uniformly in focus and the effect is as though the screen were directly in line with the projector lens axes at a distance of substantially twice the height of the box-like portion of the booth.

Each projector is provided with a switch 20 and 21 and with a rheostat 22 and 23 for adjusting the intensity of the light, so that the brilliancy of the two images which they produce may be increased or decreased and may be equalized, both to save eyestrain and for ease in comparison.

It will be apparent that the two images may be projected on the same screen and that by the use of suitable masks in the projector or on the reflecting mirrors, or by suitable adjustment of these parts, the images may be caused to overlap, to meet exactly edge to edge, or to be spaced apart, as desired.

For most purposes, having the two images in precise juxtaposition with no band of shadow or light between them will be found most satisfactory.

Referring to Figures 4 to 6, the projectors are of a type which may be used alone as well as in the booth illustrated, each comprising a base 24 which may be arranged vertically as seen in these figures, or horizontally if the projector is to be used without the booth.

This base is provided with rubber knobs or feet 25 and carries a rectangular casing 26 within which is positioned a socket 27 receiving an electric light bulb 28.

Behind the bulb is a reflector 29 supported by a baffle 30, and behind this baffle, louvres 31 are formed in the back of the housing.

Similar louvres are formed in a vertical baffle 32 above the bulb and in the end of the housing, as well as in its sides, to provide sufficient ventilation to insure the proper cooling of the space about the bulb.

In the front (or top of the housing, as shown in these figures), is a projecting tubular extension 33 which carries a lens 34, this being shown as retained by a split spring ring 35.

Mounted on the front (or top) of the base is a bracket 36 carrying the focusing lens mechanism F and behind the lens is a support guide or bracket, part of which 37 extends perpendicularly to the base 24 and has an aperture 38 through which light from the lens 34 is directed. Beyond this aperture this bracket slants toward the housing, as indicated at 39, the slanting portion both stiffening the bracket and acting as a guide for the insertion of the slide S.

On the rearward portion of the focusing lens assembly F is a sleeve or ferrule 40 having a bevelled edge 41 adjacent the aperture and bracket and a spring 42 urging the ferrule toward this bracket.

A slide S may easily be inserted by being slid along the inclined portion 39 of the bracket until its edge rides over the top of this inclined portion and under the bevelled portion 41 of the sleeve, the slide itself wedging the retainer or sleeve 40 upwardly, and is then moved forwardly until the portion desired to be projected is in alignment with the aperture 38.

The friction created by the spring 42 pressing the sleeve 40 upon the slide and holding this against the bracket 37 is quite sufficient to hold the slide in any adjusted position, while permitting its ready insertion or removal, so that the operator has merely to move the slide along the bracket as he desires, without bothering to hold or clamp it when he has obtained the image he wants on the screen.

The projectors and slide may be easily manipulated without looking at them so that the operator need only watch the screen.

While I have described the illustrated embodiment of my invention in some particularity, obviously many other embodiments, modifications and variations will readily occur to those skilled in this art, and I do not, therefore, limit myself to the precise details shown and described, but claim as my invention all embodiments, modifications, and variations coming within the scope of the appended claims.

I claim:

1. Inspection apparatus comprising a support having a smooth bearing surface and provided with an opening permitting the passage of light therethrough, light directing means directing light through the opening, a lens holder carrying a lens in alignment with said opening, a sleeve carried by said lens holder and movable toward said support, the sleeve having a smooth end adjacent the support, and a spring pressing the sleeve toward the support, the support having a smooth inclined portion diverging from a portion thereof in alignment with the end of said sleeve.

2. A projector comprising a casing, a source of light therein, the casing having a light emitting opening, a condenser lens over said opening, a bracket extending in front the condenser lens and having an aperture in registry therewith, the bracket having a smooth surface on the side remote from the lens, a focusing lens in alignment with said aperture, a tubular holder for the focusing lens fixed with respect to the casing and bracket, a sleeve surrounding the tubular holder having an inclined edge adjacent the bracket, and a spring pressing the sleeve toward the bracket.

3. A projector comprising a casing, a source of light therein, the casing having a light emitting opening, a condenser lens over said opening, a bracket extending in front of the condenser lens and having an aperture in registry therewith, the bracket having a smooth surface on the side remote from the lens, a focusing lens in alignment with said aperture, a tubular holder for the focusing lens fixed with respect to the casing and bracket, a sleeve surrounding the tubular holder having an inclined edge adjacent the bracket, and a spring pressing the sleeve toward the bracket, the bracket having an inclined portion extending toward the casing and away from the sleeve.

REX D. McDILL.

REFERENCES CITED

The following references are of record in the file of this patent:

UNITED STATES PATENTS

| Number | Name | Date |
|---|---|---|
| 1,075,789 | Patton | Oct. 14, 1913 |
| 1,199,942 | Taylor | Oct. 3, 1916 |
| 1,282,743 | Brenkert | Oct. 29, 1918 |
| 1,848,253 | Howell | Mar. 8, 1932 |
| 1,900,925 | Frappier et al. | Mar. 14, 1933 |
| 1,951,054 | Kennedy | Mar. 13, 1934 |
| 1,974,654 | May | Sept. 25, 1934 |
| 2,016,034 | Concord | Oct. 1, 1935 |
| 2,155,248 | Adams | Apr. 18, 1939 |
| 2,179,799 | Phillips | Nov. 14, 1939 |